United States Patent

Pedretti et al.

[11] Patent Number: 5,243,017
[45] Date of Patent: Sep. 7, 1993

[54] THERMOTROPIC COPOLYESTERAMIDE, PROCESS FOR ITS PREPARATION AND UTILIZATION

[75] Inventors: Ugo Pedretti; Cesarina Bonfanti, both of Milan; Enrico Montani; Arnaldo Roggero, both of San Donato Milanese; Francesco P. La Mantia, Palermo, all of Italy

[73] Assignee: Eniricerche, S.p.A., Milan, Italy

[21] Appl. No.: 612,523

[22] Filed: Nov. 13, 1990

[30] Foreign Application Priority Data

Nov. 22, 1989 [IT] Italy .................. 22485 A/89

[51] Int. Cl.$^5$ .................. C08G 63/00; C08G 63/02
[52] U.S. Cl. .................. 528/193; 528/176; 528/183; 528/184; 528/185; 528/190; 528/271
[58] Field of Search .......... 528/176, 183, 193, 184, 528/185, 190, 271

[56] References Cited

U.S. PATENT DOCUMENTS

| | | | |
|---|---|---|---|
| 4,562,244 | 12/1985 | Yoon | 528/190 |
| 4,833,229 | 5/1989 | Magagnini et al. | 528/193 |
| 5,025,082 | 6/1991 | Kishiro et al. | 528/190 |
| 5,030,703 | 7/1991 | Pielartzik et al. | 528/176 |
| 5,068,308 | 11/1991 | Pipper et al. | 528/171 |

OTHER PUBLICATIONS

Yumiko Kumazawa, Chemical Abs., vol. 13, No. 221, (C-598) (3569), May 23, 1989, Copolyester, Copolyester-Amide and Production of Injection-Moldable Material Prepared Therefrom.

*Primary Examiner*—John Kight, III
*Assistant Examiner*—T. Mosley
*Attorney, Agent, or Firm*—Hedman, Gibson & Costigan

[57] ABSTRACT

A thermotropic copolyesteramide, with a nematic structure of the liquid crystalline phase within a desired temperature range of the mesophase, contains metered amounts of units derived from: (a) a saturated aliphatic -dicarboxylic acid; (b) 4,4'-dihydroxydiphenyl; (c) 4-hydroxybenzoic acid and (d) 4-aminobenzoic acid or (d') 4-aminophenol.

This thermotropic copolyesteramide, produced by the copolymerization of monomers in the molten state, is a material with self-reinforcing characteristics capable of yielding, by normal injection or extrusion processes, remarkable molecular orientations which impart a high rigidity to the manufactured products.

The copolyesteramide may be used as a reinforcement material for traditional thermoplastic polymers, by usual techniques.

6 Claims, 1 Drawing Sheet

THERMOTROPIC COPOLYESTERAMIDE, PROCESS FOR ITS PREPARATION AND UTILIZATION

DESCRIPTION

The present invention relates to a thermotropic copolyesteramide and a process for its preparation.

The invention also relates to the use of such thermotropic copolyesteramide as self-reinforced material or reinforcement material for traditional thermoplastic polymers.

Polymers are known to the art which are capable of maintaining a high degree of intermolecular order in the liquid state and exhibit a behaviour pattern characteristic of a crystalline liquid. Two categories of such polymers are known, namely lyotropic polymers, which give rise to ordered systems in solution, and thermotropic polymers which give rise to ordered systems in the molten state. Many thermotropic polymers of a polyester type are known, having a completely aromatic structure.

Some thermotropic polymers of the polyester type are also known to the art, in the chains of which rigid units (of an aromatic type) are interlinked by flexible segments (of an aliphatic type), such as thermotropic polyesters containing in the macromolecule, units derived from a saturated aliphatic dicarboxylic acid and from 4,4'-dihydroxydiphenyl, described by Asrar et al in the Journal of Polymer Science, Polymer Edition, 1983 21 119, and by Krigbaum et al in Macromolecules, 1983 16 1271.

U.S. Pat. No. 4,833,229 describes a thermotropic copolyester containing in the macromolecule, units derivatives of a saturated aliphatic dicarboxylic acid, 4,4'-dihydroxydiphenyl and 4-dihydroxybenzoic acid.

It has now been found, according to the present invention, that the partial substitution of the units derived from 4,4'-dihydroxy diphenyl by units derived from 4-aminophenyl, or the partial substitution of units derived from 4-hydroxybenzoic acid by units derived from 4-aminobenzoic acid, in the macromolecular chains of the copolyester described in U.S. Pat. No. 4,833,229, enables a copolyesteramide constituting a new and useful material to be obtained. It has been found, in particular, that a copolyesteramide of this type possesses thermotropic characteristics within a desired temperature range of the mesophase and that in use such a self-reinforced or reinforcement material displays unexpectedly improved characteristics, especially in regard to the elasticity modulus and the tensile strength.

The present invention accordingly relates, in a first embodiment, to a thermotropic copolyesteramide having a nematic structure of the liquid crystalline phase within the temperature range from 215° to 320° C. and containing in the macromolecule units derived from:

(a) a saturated aliphatic α,ω-dicarboxylic acid:

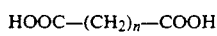

in which: n varies from 3 to 8;
(b) 4,4'-dihydroxydiphenyl:

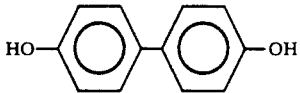

(c) 4-hydroxybenzoic acid:

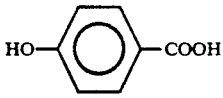

and contains in addition units derived from 4-aminobenzoic acid:
(d)

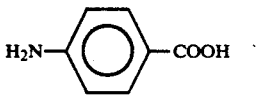

provided that the following ratios between the units are complied with:

(a)/(b)=1/1;
[(c)+(d)]/(a)=from 0.5/1 to 2.5/1;
(d)/[(c)+(d)]=from 0.05/1 to 0.3/1;
or with units derived from:
(d') 4-aminophenol

provided that the following ratios between the units are complied with:

(a)/[(b)+(d')]=1/1;
(c)/(a)=from 0.5/1 to 2.5/1;
(d')/[(b)+(d')]=from 0.05/1 to 0.3/1.

Where the copolyesteramide according to the present invention contains (d) units derived from 4-aminobenzoic acid, the preferred ratios between the units are as follows:

(a)/(b)=1/1;
[(c)+(d)]/(a)=from 1/1 to 2/1;
(d')/[(c)+(d)]=from 0.1/1 to 0.15/1.

Where the copolyesteramide according to the present invention contains (d') units derived from 4-aminophenol, the preferred ratios between the units are as follows:

(a)/[(b)+(d')]=1/1;
(c)/(a)=from 1/1 to 2/1;
(d)/[(b)+(d')]=from 0.1/1 to 0.15/1.

The copolyesteramide according to the present invention may be obtained by copolymerization in the molten state of a mixture of a saturated aliphatic α,ω-dicarboxylic acid, 4,4'-diacyloxydiphenyl, 4-acyloxybenzoic acid and 4-acylaminobenzoic acid or 4-acyloxyanilide.

Examples of the saturated aliphatic α,ω-dicarboxylic acids (a), used for purposes of the present invention, are: suberic acid, sebacic acid and adipic acid. Preference is given among all to sebacic acid.

The preferred 4,4'-diacyloxydiphenyl is 4,4'-diacetoxydiphenyl, obtainable by reacting 4,4'-dihydroxydiphenyl with acetic anhydride. The preferred 4-acyloxybenzoic acid is 4-acetoxybenzoic acid obtainable by reacting 4-hydroxybenzoic acid with acetic anhydride. The preferred 4-acylaminobenzoic acid is the 4-acetylaminobenzoic acid obtainable from 4-aminobenzoic acid by reacting with acetic anhydride. The preferred 4-acyloxyanilide is the 4-acetoxyacetanilide obtainable by reacting 4-aminophenol with acetic anhydride.

The copolymerization reaction is carried out in the presence of catalysts such as tin dialkyloxides, tin diaryloxides, titaniym dioxide, antimony dioxide and metallic alkaline or alkaline earth carboxylates. The preferred catalyst is sodium acetate. It is in general of advantage to use a quantity of catalyst varying between 0.01 and 1 part by weight per 100 parts by weight of the monomers undergoing copolymerization.

Copolymerization is carried out by heating the mixture to the melting point of the reagents (about 200° to 220° C.), then raising the temperature progressively to values of the order of 320° C. and preferably to values of the order of 270°–290° C.

During copolymerization carboxylic acid is evolved corresponding to the acyl function introduced into the mixture, and in particular the acetic acid, where the acyl function is the acetyl function which is removed from the reaction mixture. It is advantageous to operate at a reduced pressure, at least during the final period of copolymerization, in order to eliminate the carboxylic acid reaction byproduct and any other components of low molecular weight, so as to increase the degree of polymerization to the required level. The time required for polymerization may vary from 1 to 10 hours, being preferably of the order of 3–6 hours.

On completion of the copolymerization reaction, the copolyesteramide may undergo purification, for example by prolonged extraction to boiling with organic solvents, for example chloroform or boiling acetone, or by precipitation of the solutions in organic solvents.

The copolyesteramide thus obtained has inherent viscosity values between 1 and 5 dl/g, when determined at 60° C. in a pentafluorophenol solution at a concentration of 0.1 g/dl.

Characterization of the copolyesteramide is carried out on samples in powder form by X-ray diffraction, using a vertical Philips goniometer, equipped for electronic pulse counting and using the Cu $K\overline{\alpha}$ radiation.

The X-ray diffraction spectrum mainly characteristic of the present compound yields a single very intense reflection and a $2\nu$ angular section between 19.5° and 21.5°, indicating a pseudohexagonal crystalline phase.

Figure 1:
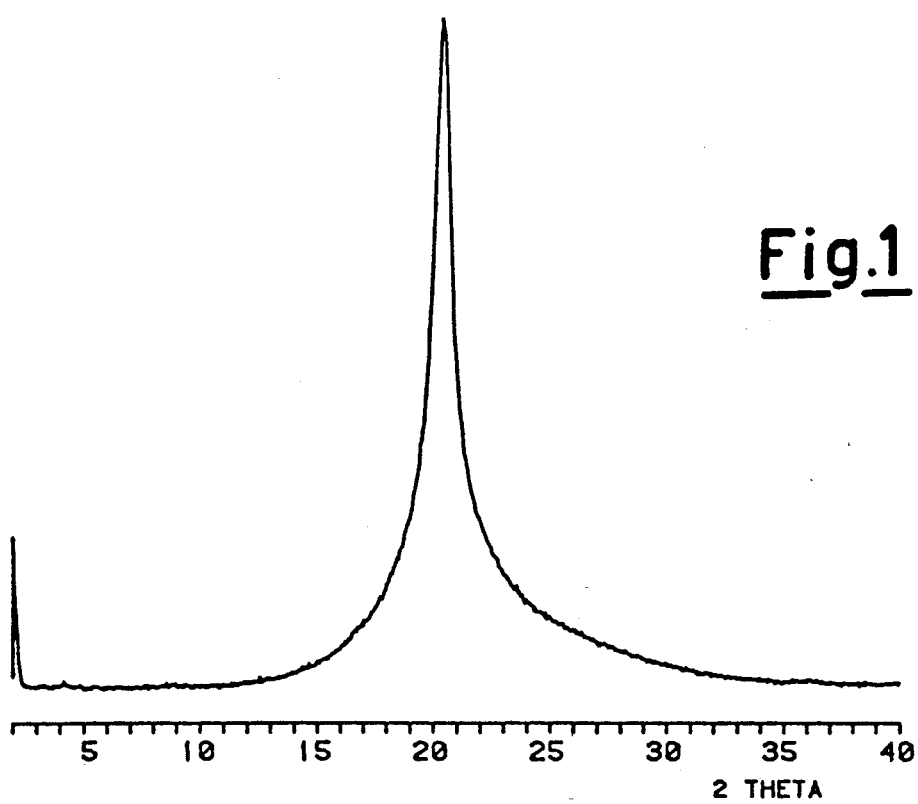
FIG. 1 shows, in graphic form, the x-ray diffraction spectrum of the copolyesteramide of Example 1.

The thermotropic copolyesteramide of the present invention has a crystal/nematic mesophase transition point at 215°–260° C., depending on its composition. The nematic mesophase/isotropic state transition point is in all cases over 320° C. The crystal/nematic mesophase and nematic mesophase/isotropic state transitions are determined by differential scanning calorimetry (DSC), using a Mettler TA 4000 instrument and by polarized light optical microscope, fitted with a heating table.

The thermotropic copolyesteramide of the present invention may be processed by the usual working technologies such as injection pressing, and extrusion. Extrusion techniques can induce preferred orientations in the direction of flow, which are increased by drawing. In terms of its mechanical strength characteristics, the extruded and drawn copolyesteramide has a stretching modulus of 20–40 GPa and tensile strengths of 400–700 MPa.

The thermotropic copolyesteramide of the present invention may also be used as a reinforcement agent for conventional thermoplastic materials such as polycarbonates, polyethylene terephthalates, polybutylene terephthalates and nylon, used in concentrations of 5–30 parts by weight copolyesteramide per 100 parts by weight thermoplastic polymer. The mechanical characteristics of the thermoplastic material are improved as a result of the addition of the copolyesteramide. Addition of the copolyesteramide causes a significant reduction in the viscosity of the mixture, thus enabling polymer spinning to be carried out at a temperature lower than that normally required for processing of the thermoplastic polymer and at the same time exploiting the hot drawing step to its best.

The experimental examples set out below provide a better illustration of the present invention.

EXAMPLE 1

The following reagents are introduced into a triple-necked distillation flask, fitted with a stirring mechanism connected to a Brignole seal, a nitrogen injection tube and a condenser:

| sebacic acid | 6.06 g | (30 mmol) |
|---|---|---|
| 4,4'-diacetoxydiphenyl | 7.69 g | (28.5 mmol) |
| 4-acetoxyacetanilide | 0.29 g | (1.5 mmol) |
| 4-acetoxybenzoic acid | 10.8 g | (60 mmol) |
| sodium acetate | 0.03 g | (0.37 mmol) |

The mixture is heated to 220° C. in a molten salt bath, at which temperature complete melting of the reagent mixture has been obtained, under a gentle nitrogen flow. The reaction temperature is raised to 270° C. over a period of 3 hours, during which the acetic acid is distilled and condensed in a test tube which is held at −78° C. with dry ice. During this period the viscosity of the molten material increases gradually and the stirring speed is reduced at the same time. The nitrogen flow is then disconnected and the molten material subjected to pressure reduction, still at 270° C., until a final value of $10^{-2}$ mm Hg is reached. The reaction is continued under these conditions for a further 2 hours. Cooling is then continued, still under vacuum, until ambient temperature is reached.

After mixing with dry ice, the copolyesteramide thus obtained undergoes fine machining in a blade mill followed by Soxhlet extraction with acetone at boiling point for 8 hours and drying under vacuum at 70° C. for 2 hours. 13.6 g copolyesteramide is obtained, having an inherent viscosity (IV) of the order of 1.8 dl/g, determined at 60° C. in pentafluorophenol solution at a concentration of 0.1 g/dl. Its crystal/nematic mesophase transition point is located at 230° C. (determined by DSC) and its X-ray diffraction spectrum is shown in FIG. 1.

EXAMPLE 2

The following materials are introduced into the reactor vessel of Example 1:

| | | |
|---|---|---|
| sebacic acid | 6.05 g | (30 mmol) |
| 4,4'-diacetoxydiphenyl | 8.10 g | (30 mmol) |
| 4-acetylaminobenzoic acid | 1.61 g | (9 mmol) |
| 4-acetoxybenzoic acid | 9.18 g | (51 mmol) |
| sodium acetate | 0.03 g | (0.37 mmol) |

Figure 2:
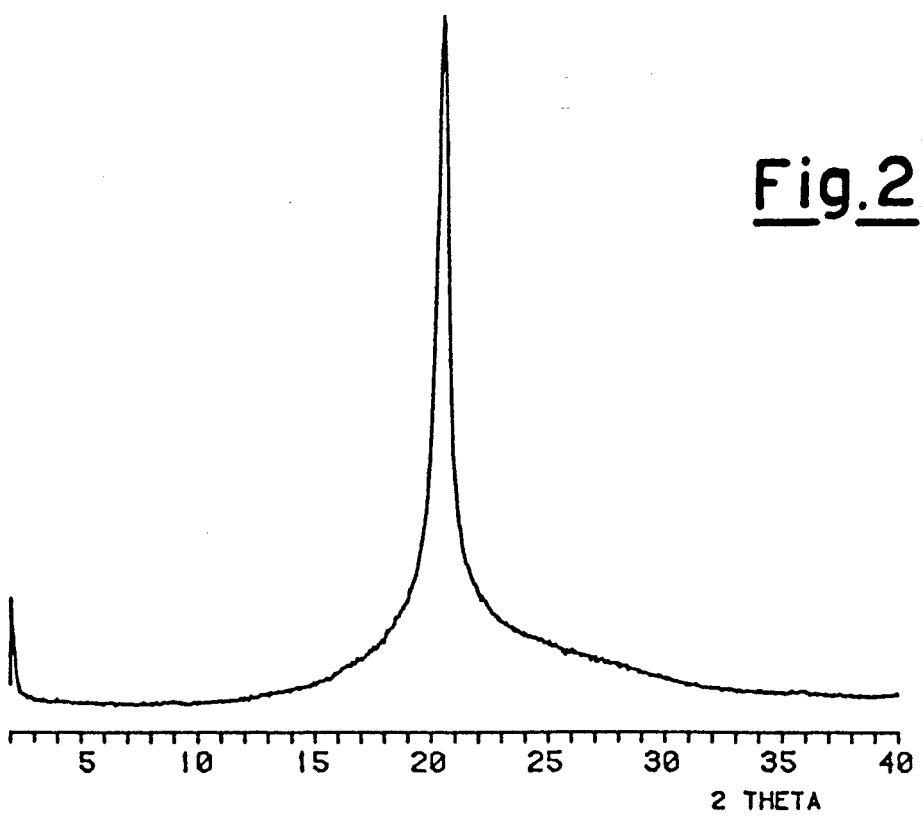
FIG. 2 shows, in graphic form, the x-ray diffraction spectrum of the copolyesteramide of Example 2.

The operations described in Example 1 yield 11 g copolyesteramide having an inherent viscosity (IV) of the order of 1.2 dl/g (determined at 60° C. in a 0.1 g/dl pentafluorophenol solution), with a crystal/nematic meso-phase transition point at 245° C. (determined by DSC) and an X-ray diffraction spectrum which is shown in FIG. 2.

EXAMPLE 3

The copolyesteramide obtained by the procedure described in Example 1 undergoes a spinning and drawing process, using a Ceast Rheoscope 1000 viscometer fitted with a tensile module and a conical nozzle having a half-angle of 30° and a diameter of 1 mm. The operation is carried out at 280° C. and at a drawing ratio within the range from 50 to 150.

The fibre thus obtained has a stretching module between 20 and 30 GPa, a tensile strength between 400 and 500 MPa and elongation at break between 3% and 2%.

The mechanical characteristics are determined with a model 6025 Instron instrument having a velocity gradient of 0.5 min$^{-1}$.

EXAMPLE 4

The copolyesteramide obtained by the procedure described in Example 2 undergoes a spinning and drawing process, using a Ceast Rheoscope 1000 viscometer fitted with a tensile module and a conical nozzle having a half-angle of 30° and a diameter of 1 mm. The operation is carried out at 300° C. and at a drawing ratio within the range from 150 to 300.

The fibre thus obtained has a stretching module between 25 and 40 GPa, a tensile strength between 500 and 700 MPa and elongation at break between 3% and 2%.

The mechanical characteristics are determined with a model 6025 Instron instrument having a velocity gradient of 0.5 min$^{-1}$.

We claim:

1. A thermotropic copolyesteramide having a nematic structure of the liquid crystalline phase at temperatures within the range from 215° C. to 320° C., comprising in the macromolecule, units derived from:
   (a) a saturated aliphatic α, ω-dicarboxylic acid of the formula:

HOOC—(CH$_2$)$_n$—COOH wherein n varies from 3 to 8;
   (b) 4,4'-dihydroxydiphenyl:

(c) 4-hydroxybenzoic acid:

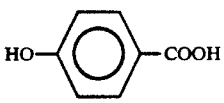

and either additionally comprising units derived from:
   (d) 4-aminobenzoic acid:

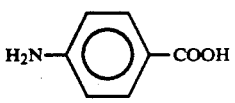

having the following unit ratios:
   (a)/(b)=1;
   ((c)+(d))/(a)=from 0.5/1 to 2.5/1; and
   (d)/((c)+(d))=from 0.5/1 to 0.3/1;
   or units derived from:
   (d') 4-aminophenol:

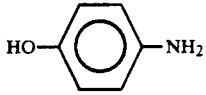

having the following unit ratios:
   (a)/((b)+(d'))=1/1;
   (c)/(a)=from 0.5/1 to 2.5/1; and
   (d')/((b)+(d))=from 0.05/1 to 0.3/1.

2. A copolyesteramide according to claim 1, wherein said units (d) are derived from 4-aminobenzoic acid, and having the following unit ratios:
   (a)/(b)=1/1;
   ((c)+(d))/(a)=from 1/1 to 2/1; and
   (d)/((c)+(d))=from 0.1/1 to 0.15/1.

3. A copolyesteramide according to claim 1, wherein said units (d') are derived from 4-aminophenol, and having the following unit ratios:
   (a)/((b)+(d'))=1/1;
   (c)/(a)=from 1/1 to 2/1; and
   (d')/((b)+(d'))=from 0.1/1 to 0.15/1.

4. A copolyesteramide according to claim 1, having an inherent viscosity between 1 and 5 dl/g, determined at 60° C. in pentafluorophenol solution at a concentration of 0.1 g/dl.

5. A fiber or pressed article comprising a copolyesteramide according to claim 1.

6. A thermotropic copolyesteramide having a nematic structure of the liquid crystalline phase at temperatures within the range from 215° C. to 320° C., consisting essentially of units derived from:
   (a) a saturated aliphatic α, ω-dicarboxylic acid of the formula:

HOOC—(CH$_2$)$_n$—COOH wherein n varies from 3 to 8;

(b) 4,4'-dihydroxydiphenyl:
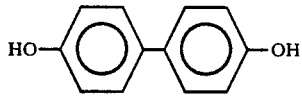
(c) 4-hydroxybenzoic acid:
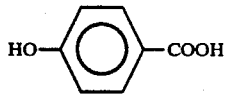
and either additionally consisting essentially of units derived from:
(d) 4-aminobenzoic acid:
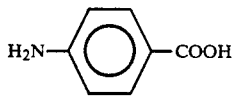
having the following unit ratios:
(a)/(b)=1;
((c)+(d))/(a)=from 0.5/1 to 2.5/1; and
(d)/((c)+(d))=from 0.5/1 to 0.3/1;
or units derived from:
(d') 4-aminophenol:
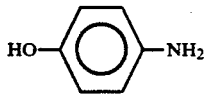
having the following unit ratios:
(a)/((b)+(d'))=1/1;
(c)/(a)=from 0.5/1 to 2.5/1; and
(d')/((b)+(d))=from 0.05/1 to 0.3/1.
* * * * *